Figure 1:
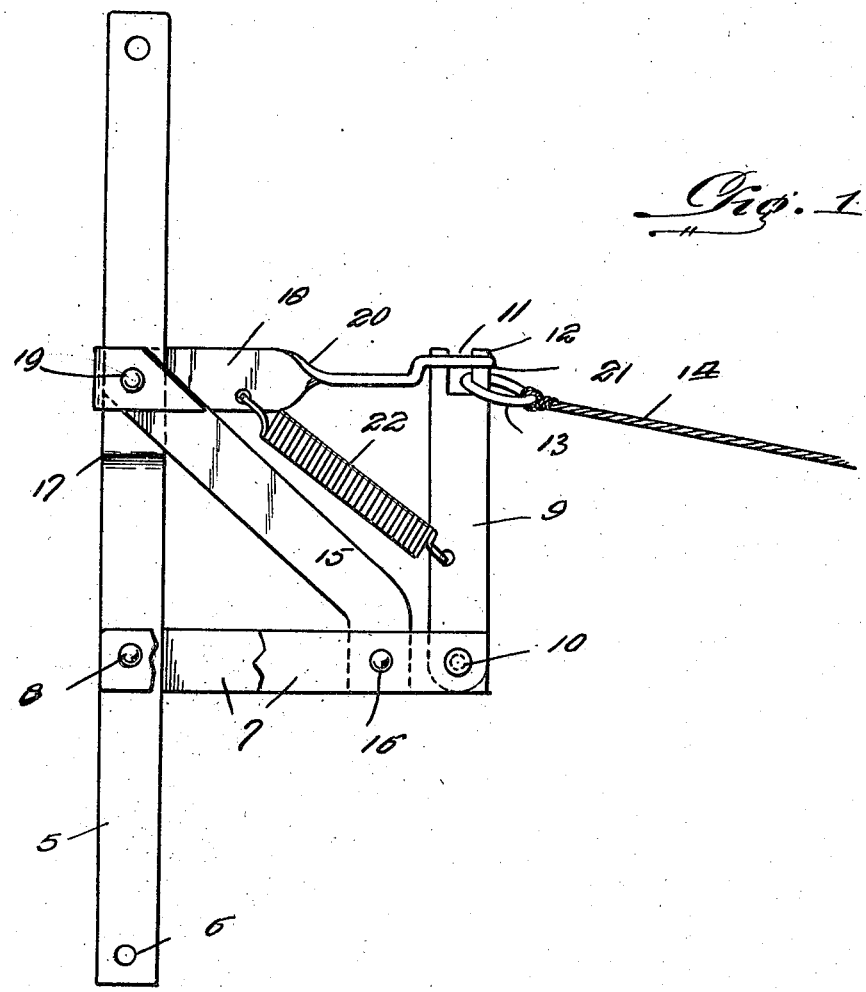

Nov. 18, 1924. 1,516,015
C. JOHNSON
TRIP ROPE RELEASING DEVICE
Filed Aug. 20, 1923

Witnesses:

Clarence Johnson,
Inventor

Patented Nov. 18, 1924.

1,516,015

UNITED STATES PATENT OFFICE.

CLARENCE JOHNSON, OF RUTHVEN, IOWA.

TRIP-ROPE-RELEASING DEVICE.

Application filed August 20, 1923. Serial No. 658,237.

*To all whom it may concern:*

Be it known that I, CLARENCE JOHNSON, citizen of the United States, residing at Ruthven, in the county of Palo Alto and State of Iowa, have invented certain new and useful Improvements in Trip-Rope-Releasing Devices, of which the following is a specification.

This invention relates to improvements in devices for automatically releasing plow trip ropes from connection with a tractor on tractor drawn plows, wherein a frangible or automatic releasing drawing connection is provided between the plow and the tractor, so that when the plow strikes an obstruction sufficient to cause the release of the plow from the tractor, the device forming the subject of this invention will permit the release of the trip rope to prevent breakage of the same.

The primary object of the invention is to provide a plow trip rope releasing device which will be simple and durable in construction, and reliable and efficient in operation.

A further object of the invention is to provide a device of the above kind, which embodies a comparatively small number of parts which are not liable to readily get out of order, and which are of such simple and practical form as to insure the device meeting with all of the requirements for a successful commercial use.

Other objects will appear as the nature of the invention is better understood, and the same consists in the novel form, combination and arrangement of parts, hereinafter more fully described, shown in the accompanying drawings and claimed.

Figure 2:
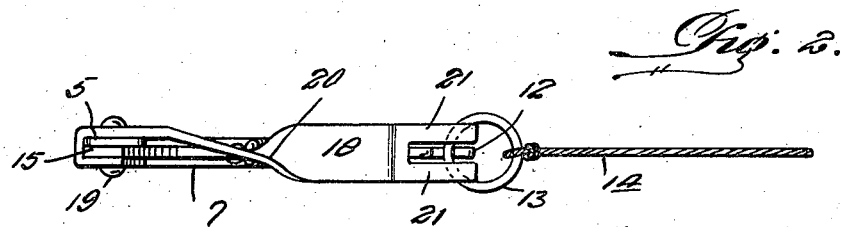

In the drawing, wherein like reference characters indicate corresponding parts in the two views:

Figure 1 is an elevational view of a trip rope releasing device constructed in accordance with the present invention and partly broken away, and, Figure 2 is a top plan view of the device shown in Figure 1.

Referring more in detail to the drawing, the present invention comprises a bar 5 which is provided with perforations 6 in the ends thereof for the reception of bolts whereby the device may be readily rigidly secured to the rear end of a tractor. The forward end of a pair of spaced parallel bars 7 are secured against opposite sides of the bar 5 by riveting or the like as at 8, at a point inwardly of one end of said bar 5 as shown in Figure 1, while an arm 9 has one end of the same pivotally mounted as at 10 between the rear ends of the bars 7. The other or free end of the arm 9 is bifurcated, as at 11 to provide a pair of prongs 12 upon one of which is adapted to be disposed a ring 13 which is fastened to the forward end of the trip rope 14, which extends to the plow in usual and well known manner.

The bars 7 are held at right angles to the bar 5 by means of a base bar 15 which extends diagonally from the outer end portions of the bars 7 to a point wherein the same engages one face of the bar 5 as shown clearly in Figure 1. The rear end of the base bar 15 is secured between the bars 7 forwardly of the pivot 10 by riveting or the like as at 16, and in order that the base bar 15 may be perfectly flat, the bar 5 is offset between its ends in a lateral direction so as to occupy a different plane at its portion to which the bars 7 are attached than that portion upon which the forward end of the base bar 15 lies.

A further bar 18 has its forward end return bent to embrace one side of the bar 5, and the outer side of the adjacent end of the brace 15, and the bars 5, 15, and 18 are rigidly secured together at this point by riveting or the like 19. The rear end portion of the bar 18 is twisted at right angles as indicated at 20, and the free rear end portion thereof is bifurcated to provide a pair of arms 21 between which the prongs 12 of the arm 9 are adapted to be positioned, and from between which said prongs 12 may move upon rearward swinging movement of the arm 9 as will presently become apparent.

The ends of a tension spring 22 are respectively connected to the bar 18 and the arm 9 so as to normally hold the latter at right angles to the bars 7 and 18 with the prongs 12 disposed between the arms 21 so that the ring 13 is retained upon the prong 12 under normal conditions.

In operation, assuming that a device is applied to a tractor which is utilized to tow or draw a plow, and with the parts disposed as shown in the drawing, with the ring 13 upon one of the prongs 12 and with the arm 9 held yieldingly by the spring 22 with said prongs 12 disposed between the arms 21 of the bar 18, the plow trip rope 14 will be held by reason of the fact that the rings 13 attached thereto cannot accidentally disengage from said prongs. It is well known that the hitch between the plow and tractor usually embodies a frangible pin or the like which operates upon the plow striking a relatively movable object in the ground, to detach the plow from the tractor so as to avoid the damage to the same. When the plow is thus attached, the continued forward movement of the tractor will result in the rope 14 exerting a rearward pull upon the arm 9 sufficient to overcome the strength of the spring 22 so as to move the prongs 12 rearwardly from between the arms 21. Upon further rearward movement of the arm 9, the ring 13 will slip off of the prong with which it is engaged, and in this manner, damage of the trip rope 14 and parts associated therewith is effectively prevented.

The construction and operation as well as the advantages of the invention will be readily understood from the foregoing description by those skilled in the art, and it will also be seen that the device will be extremely reliable in operation and is constructed in durable manner of relatively few simple parts.

Minor changes may be made without departing from the spirit and scope of the invention as claimed.

What I claim as new is:

1. A plow trip rope releasing device comprising a longitudinal bar bifurcated at its rear end, a swinging arm pivoted at one end and bifurcated at its other end to provide a pair of prongs with one of which the trip rope is adapted to be detachably engaged, and yieldable means for normally holding said arm positioned at right angles to said bar with the prongs within the bifurcations of the bar.

2. In combination with a plow trip rope having a ring or loop upon its forward end, of a longitudinally swinging arm pivoted at one end and provided with a prong at its other end upon which the rope ring may be positioned, means to mount said arm upon a tractor, and a yieldable means to normally hold the arm in a forwardly swung position substantially at right angles to said trip rope for preventing disengagement of the ring from said prong.

3. In combination with a plow trip rope having a ring or loop upon its forward end, of a longitudinally swinging arm pivoted at one end and provided with a prong at its other end upon which the rope ring may be positioned, means to mount said arm upon a tractor, and a yieldable means to normally hold the arm in a forwardly swung position substantially at right angles to said trip rope for preventing disengagement of the ring from said prong, and a longitudinally extending bar having a bifurcated rear end within which said prong is normally disposed for assisting in retention of the rope ring on said arm, said arm being movable rearwardly upon the occurrence of a pull upon said rope from between the bifurcations of said bar.

In testimony whereof I affix my signature.

CLARENCE JOHNSON.